(12) United States Patent
Ledoux et al.

(10) Patent No.: US 11,562,601 B2
(45) Date of Patent: Jan. 24, 2023

(54) METHOD FOR PROVIDING A SERVICE LINKED TO THE CONDITION AND/OR BEHAVIOR OF A VEHICLE AND/OR OF A TIRE

(71) Applicant: COMPAGNIE GENERALE DES ETABLISSEMENTS MICHELIN, Clermont-Ferrand (FR)

(72) Inventors: Thomas Ledoux, Clermont-Ferrand (FR); Nicolas Fangeat, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 51 days.

(21) Appl. No.: 16/618,501

(22) PCT Filed: May 31, 2018

(86) PCT No.: PCT/FR2018/051262
§ 371 (c)(1),
(2) Date: Dec. 2, 2019

(87) PCT Pub. No.: WO2018/220334
PCT Pub. Date: Dec. 6, 2018

(65) Prior Publication Data
US 2020/0126323 A1    Apr. 23, 2020

(30) Foreign Application Priority Data

Jun. 2, 2017   (FR) ...................................... 1754916

(51) Int. Cl.
*G07C 5/00* (2006.01)
*B60C 11/24* (2006.01)
*B60C 23/04* (2006.01)
*B60C 23/20* (2006.01)
(Continued)

(52) U.S. Cl.
CPC ............ *G07C 5/008* (2013.01); *B60C 11/243* (2013.01); *B60C 23/0479* (2013.01);
(Continued)

(58) Field of Classification Search
None
See application file for complete search history.

(56) References Cited

U.S. PATENT DOCUMENTS 4,789,941 A * 12/1988 Nunberg ................. G01S 15/88
340/933
5,751,227 A *  5/1998 Yoshida ............... G07B 15/063
340/907
(Continued)

FOREIGN PATENT DOCUMENTS

CN     106796163 A      5/2017
EP     2 009 389 A1    12/2008
(Continued)

OTHER PUBLICATIONS

International Search Report dated Sep. 4, 2018, in corresponding PCT/FR2018/051262 (4 pages).

*Primary Examiner* — Curtis J King
(74) *Attorney, Agent, or Firm* — Venable LLP

(57) ABSTRACT

A method for providing a service linked to the condition and/or behavior of a vehicle and/or of a tire comprises the following steps: when a vehicle passes a road infrastructure equipped with a system for assessing the condition of a vehicle, determining an identifier of the vehicle and/or of a tire of the vehicle, at the same time, determining at least one parameter representative of the condition of the vehicle and/or of a component of the vehicle, transmitting the determined data to a remote data server, from the identification data, retrieving external data concerning the vehicle and/or the tire and/or the running conditions, combining the determined information with the external data such as to (Continued)

determine a relevant indicator concerning the condition and/or the behavior of a vehicle, and transmitting the relevant indicator to a provider of a service linked to the condition and/or to the behavior of a vehicle and/or of a tire.

11 Claims, 1 Drawing Sheet

(51) Int. Cl.
  *G06K 7/10* (2006.01)
  *G06K 19/077* (2006.01)
(52) U.S. Cl.
  CPC .......... *B60C 23/20* (2013.01); *G06K 7/10297* (2013.01); *G06K 19/07764* (2013.01)

(56) References Cited

U.S. PATENT DOCUMENTS

| | | | | |
|---|---|---|---|---|
| 5,974,368 | A * | 10/1999 | Schepps | G07C 5/008 340/10.2 |
| 6,129,025 | A * | 10/2000 | Minakami | B60L 13/03 104/88.01 |
| 6,441,732 | B1 * | 8/2002 | Laitsaari | B60C 23/0401 340/438 |
| 7,474,214 | B2 * | 1/2009 | Bauchot | B60C 23/0416 340/572.1 |
| 7,578,180 | B2 | 8/2009 | Lionetti et al. | |
| 9,349,287 | B1 * | 5/2016 | Holzwanger | G08G 1/0141 |
| 10,067,502 | B1 * | 9/2018 | Delp | G06Q 10/20 |
| 10,222,299 | B2 | 3/2019 | Ledoux et al. | |
| 10,591,376 | B2 * | 3/2020 | Ledoux | G01L 1/18 |
| 10,636,227 | B2 | 4/2020 | Wittmann et al. | |
| 10,783,792 | B1 * | 9/2020 | Price | G08G 1/207 |
| 2003/0006895 | A1 * | 1/2003 | Drake | B60C 23/0408 340/445 |
| 2004/0107042 | A1 * | 6/2004 | Seick | G08G 1/0104 701/117 |
| 2004/0164140 | A1 * | 8/2004 | Voeller | G07C 5/008 235/375 |
| 2005/0110624 | A1 * | 5/2005 | Nicot | B60C 23/0408 340/445 |
| 2006/0124214 | A1 * | 6/2006 | Bauchot | B60C 11/24 152/154.2 |
| 2006/0208902 | A1 * | 9/2006 | Brey | B60C 11/24 340/572.8 |
| 2006/0273148 | A1 * | 12/2006 | Karstens | F16D 66/021 235/375 |
| 2006/0290484 | A1 * | 12/2006 | Bauchot | B60C 23/0416 340/442 |
| 2007/0018803 | A1 * | 1/2007 | Lang | G01L 17/005 340/442 |
| 2007/0018805 | A1 * | 1/2007 | Dixon | B60C 23/0449 340/447 |
| 2007/0222568 | A1 * | 9/2007 | Morar | G07C 5/085 340/447 |
| 2007/0277602 | A1 * | 12/2007 | Heise | B60C 23/0433 73/146.5 |
| 2008/0040268 | A1 * | 2/2008 | Corn | G06Q 30/04 705/305 |
| 2008/0084285 | A1 * | 4/2008 | Bhogal | B60C 11/24 340/438 |
| 2008/0278288 | A1 * | 11/2008 | O'Brien | B60C 23/007 340/10.1 |
| 2008/0288406 | A1 * | 11/2008 | Seguin | G06Q 30/02 705/50 |
| 2009/0000370 | A1 | 1/2009 | Lionetti et al. | |
| 2009/0078347 | A1 * | 3/2009 | Niklas | B60C 11/246 152/154.2 |
| 2009/0224899 | A1 * | 9/2009 | Wieser | B60C 23/0433 340/444 |
| 2010/0090819 | A1 * | 4/2010 | Benedict | G07C 5/085 340/447 |
| 2010/0114437 | A1 * | 5/2010 | Boss | B60W 10/22 701/48 |
| 2010/0139383 | A1 * | 6/2010 | Haswell | G01B 7/26 73/146 |
| 2010/0156641 | A1 * | 6/2010 | Lionetti | B60C 23/0479 340/572.1 |
| 2010/0186492 | A1 * | 7/2010 | Morinaga | B60C 11/24 73/146 |
| 2011/0238241 | A1 * | 9/2011 | Brady | B61L 25/048 701/19 |
| 2011/0279283 | A1 * | 11/2011 | Corn | G08B 13/2417 340/686.6 |
| 2012/0203428 | A1 * | 8/2012 | Choi | B60G 17/08 701/37 |
| 2012/0235807 | A1 | 9/2012 | Rysenga et al. | |
| 2012/0296515 | A1 * | 11/2012 | Boss | G01C 21/3453 701/32.3 |
| 2012/0320204 | A1 | 12/2012 | Dahlin | |
| 2014/0049390 | A1 * | 2/2014 | Wagner | G07C 5/0825 340/539.13 |
| 2014/0288859 | A1 | 9/2014 | Wittmann | |
| 2015/0025945 | A1 * | 1/2015 | Kleven | G01G 3/16 705/13 |
| 2015/0158345 | A1 * | 6/2015 | Kavarana | B60C 23/0401 701/33.9 |
| 2015/0178578 | A1 * | 6/2015 | Hampiholi | G08G 1/091 348/149 |
| 2016/0031272 | A1 * | 2/2016 | Peine | B60C 23/0493 340/442 |
| 2016/0041028 | A1 * | 2/2016 | Hammerl | B66F 9/06 701/50 |
| 2016/0075189 | A1 * | 3/2016 | Engel | B60C 11/24 340/438 |
| 2016/0096402 | A1 * | 4/2016 | Carlin | B60C 23/0479 340/442 |
| 2016/0117928 | A1 * | 4/2016 | Hodges | G08G 1/0967 701/99 |
| 2016/0133067 | A1 * | 5/2016 | Sinner | B60C 23/0408 340/459 |
| 2016/0167446 | A1 * | 6/2016 | Xu | B60C 23/0479 702/34 |
| 2016/0200153 | A1 * | 7/2016 | Rothstein | B60C 23/0486 701/34.4 |
| 2016/0232565 | A1 * | 8/2016 | Goergen | B60C 23/0479 |
| 2016/0343178 | A1 * | 11/2016 | Lesesky | G06K 19/07764 |
| 2017/0023441 | A1 * | 1/2017 | Luk | B60C 23/04 |
| 2017/0124784 | A1 | 5/2017 | Wittmann et al. | |
| 2017/0322092 | A1 * | 11/2017 | Vidaillac | G07C 5/008 |
| 2017/0322117 | A1 | 11/2017 | Ledoux et al. | |
| 2017/0350792 | A1 | 12/2017 | Ledoux et al. | |
| 2018/0009271 | A1 | 1/2018 | Ledoux et al. | |
| 2018/0068495 | A1 * | 3/2018 | Chainer | B62D 15/025 |
| 2018/0102730 | A1 * | 4/2018 | Brusaw | G08G 1/02 |
| 2018/0215211 | A1 * | 8/2018 | Ledoux | B60C 23/0422 |
| 2019/0020844 | A1 * | 1/2019 | Teixeira | G09B 7/02 |
| 2019/0210619 | A1 * | 7/2019 | Linda | B60W 50/082 |
| 2020/0108576 | A1 * | 4/2020 | Setokawa | B29D 30/0601 |
| 2020/0122521 | A1 | 4/2020 | Ledoux et al. | |
| 2020/0286310 | A1 * | 9/2020 | Carver | G06Q 40/08 |
| 2020/0364651 | A1 * | 11/2020 | Ishiyama | G06Q 50/04 |
| 2020/0378781 | A1 * | 12/2020 | Kantarjiev | G08G 1/0968 |
| 2021/0003481 | A1 * | 1/2021 | Strege | G07C 5/0808 |
| 2021/0107324 | A1 * | 4/2021 | Kalyanaraman | B60C 23/04 |
| 2021/0138851 | A1 * | 5/2021 | Tompkins | G07C 5/006 |
| 2021/0166503 | A1 * | 6/2021 | Shimomura | B60C 11/246 |
| 2021/0170804 | A1 * | 6/2021 | Tanno | B60C 11/246 |

FOREIGN PATENT DOCUMENTS

| | | | | |
|---|---|---|---|---|
| GB | 2443965 | A * | 5/2008 | ............ B60C 11/24 |
| JP | 2016-57826 | A | 4/2016 | |
| WO | 2005/113261 | A1 | 12/2005 | |
| WO | 2013/065049 | A1 | 5/2013 | |
| WO | 2016/096662 | A1 | 6/2016 | |

* cited by examiner

METHOD FOR PROVIDING A SERVICE LINKED TO THE CONDITION AND/OR BEHAVIOR OF A VEHICLE AND/OR OF A TIRE

FIELD OF THE INVENTION

The present invention relates to a method for providing a service linked to the condition and/or behaviour of a vehicle and/or of a tyre.

Numerous vehicle diagnostics systems are known. In the case of wear, mention may thus be made of wear indicators present on tyres or manual devices for measuring the depth of rubber remaining on a tyre.

In the case of measuring pressure, mention may be made of the systems installed directly on vehicle wheels, which determine pressure by means of a pressure sensor and then send the information by radio frequency to the central electronic unit of the vehicle; onboard systems measuring the pressure of contact of tyres on the ground or, alternatively, manual manometers.

The present invention seeks to provide a method that makes it possible to provide a value-added service based on parameters concerning the condition and/or the behaviour of a vehicle and/or of a tyre. In point of fact, there are no known systems that currently allow the cross-checking of a range of information concerning the vehicle and its tyres.

The present invention thus seeks to remedy this drawback by proposing a method such as that described below.

SUMMARY OF THE INVENTION

The invention thus relates to a method for providing a service linked to the condition and/or behaviour of a vehicle and/or of a tyre, the method comprising the following steps:
- when a vehicle passes a road infrastructure equipped with a system for assessing the condition of a vehicle, determining an identifier of the vehicle and/or of a tyre of the vehicle,
- at the same time, determining at least one parameter representative of the condition of the vehicle and/or of a component of the vehicle,
- transmitting the determined data to a remote data server,
- from the identification data, retrieving external data concerning the vehicle and/or the tyre and/or the running conditions,
- combining the determined information with the external data such as to determine a relevant indicator concerning the condition and/or the behaviour of a vehicle,
- transmitting the relevant indicator to a provider of a service linked to the condition and/or to the behaviour of a vehicle and/or of a tyre.

Preferably, the system for assessing the condition of a vehicle is installed in a mandatory travel zone of the road infrastructure.

"Road infrastructure" and "mandatory travel zone" are understood to mean, for example, an infrastructure such as a motorway and zones that it is mandatory to pass through, such as a lane for paying a toll, a motorway access lane, service station access lanes, etc. An infrastructure is also understood to mean a carpark, with zones that it is mandatory to pass through such as underground or overhead carpark access lanes. An infrastructure is also understood to mean a service area or rest area beside a road or motorway. In this case, the mandatory travel zone may be a simple traffic lane and/or a lane leading to the area, embodied in the form of markings on the ground and/or physical obstacles.

Such placement offers a plurality of advantages:
- first, this is a restricted passage point of a road and makes it possible to ensure that vehicles pass over the assessment system without having to divert vehicles from their customary path,
- second, positioning near a road infrastructure makes it possible to utilize the pre-existing communication means and infrastructures at such sites.

Furthermore, motorway system management companies have information systems that include numerous data concerning meteorological conditions and the condition of the road, which makes it possible to facilitate access to the external data.

In a preferred embodiment, the method further comprises a step during which the vehicle is geolocalized as it passes over the assessment system and wherein the geolocation data are transmitted with the other determined data.

In a preferred embodiment, the step of determining an identifier comprises a step of reading an RFID identifier installed on the vehicle and/or on a tyre.

In an alternative embodiment, the step of determining an identifier comprises a step of reading an identifier stored in a memory of a casing installed in the vehicle, such as an electronic toll badge.

In a preferred embodiment, the parameter representative of the condition of the vehicle and/or of a component of the vehicle is included in the group comprising: the pressure of a tyre, the temperature of air inside a tyre, the level of wear of a tyre, the length of the area of contact of a tyre, the speed of the vehicle, the direction of travel of the vehicle, the load carried by the vehicle and/or by each tyre.

In a preferred embodiment, the external data are included in the group comprising: the dimensions and/or characteristics of a tyre, the characteristics of the vehicle, meteorological data, data concerning the condition of a road.

In a preferred embodiment, the step of determining a parameter representative of the condition of the vehicle and/or of a component of the vehicle comprises a step of reading data stored in a pressure and/or temperature sensor installed on or in a tyre of the vehicle and/or on a wheel rim of the vehicle. For example, it is possible to read the measured and stored data using a pressure and/or temperature sensor, for example of TMS or TPMS type. It is specified, here, that use may also be made of a sensor for determining the following parameters:
- the number of revolutions completed by said tyre when running,
- the length of the area of contact of said tyre when the sensor is adhesively bonded to the interior rubber of the tyre, preferably on the side opposite the tread.

In a preferred embodiment, the step of determining a parameter comprises a step of measuring a depth of rubber remaining on a tyre by means of magnetic sensors integrated into the assessment system.

In a preferred embodiment, the relevant indicator is a vehicle overload indicator and the provider of a service is a motorway concession company and/or law enforcement personnel.

In a preferred embodiment, the relevant indicator is an indicator of an incorrect direction of travel and the provider of a service is a motorway concession company and/or law enforcement personnel.

In a preferred embodiment, the relevant indicator is an indicator of the evolution of the wear of a tyre and the provider of a service is a vehicle fleet manager and/or a vehicle maintenance agent.

In a preferred embodiment, the relevant indicator is an indicator of the incorrect inflation pressure of a tyre and the provider of a service is a vehicle fleet manager and/or a vehicle maintenance agent.

In a preferred embodiment, the system for assessing the condition of a vehicle comprises the following elements:
- a subsystem for measuring the condition of at least one tyre of the vehicle,
- a subsystem for reading identification data of a tyre and/or of the vehicle,
- a subsystem for transmitting measured data and identification data to a remote database, the three subsystems being installed in one or more casings designed to be installed on or near a road infrastructure, at least one of the casings being designed to be installed in a mandatory travel zone of the road infrastructure.

Such an assessment system may also comprise one or more of the following features, taken alone or in combination:

- The measurement subsystem and the identification data reading subsystem are advantageously installed in the casing located in the running zone of the vehicle in order that measurements may be made at the moment when the vehicle passes over the casing.
- The identification data reading subsystem comprises an RFID reader that makes it possible to read identifiers stored in RFID chips that may be installed on each of the tyres of the vehicle and/or on the vehicle itself. Advantageously, this reader comprises one or more reading antennae, chosen from linear or circular polarization antennae. Such antennae make it possible to read the RFID chips irrespective of the location of the latter on the vehicle and/or the tyres. Indeed, when a system according to the invention is used, the positioning of the RFID chips or tags on the vehicles cannot be assumed any more than can the position of the vehicle relative to the casing as the vehicle passes over said casing.
- The subsystem for measuring the condition of at least one tyre of the vehicle is a subsystem for measuring the wear of the tyre.
- The measurement subsystem comprises at least one sensor included in the group comprising: an eddy current wear sensor, a variable reluctance wear sensor, a laser-based optical wear sensor, a pressure sensor, or a load sensor. Eddy current sensors or variable reluctance sensors are particularly advantageous in the case of an exterior installation because they are unaffected by a thin layer of dust or dirt, typically a layer less than 1 millimetre thick. Such a feature is a genuine advantage in a system according to the invention because the ground over which vehicles travel at toll-collection barriers are generally not regularly cleaned owing to the difficulty of access.
- The system comprises a data reception device installed in the vehicle. In this case, it is advantageous for the measured data transmission subsystem to comprise means for transmitting data to the data reception device installed on the vehicle.
- The casing installed in the running zone is a casing of low height embedded in the ground over which vehicles travel, for example made from asphalt or concrete.
- The system comprises means of communication with an external database and means for receiving data from said database, concerning the dimensions and features of the tyres as a function of the identification data thereof.
- The system comprises means for transmitting measured data to a control system of the vehicle and/or to actuators of the vehicle and/or to safety systems of the vehicle.

BRIEF DESCRIPTION OF THE FIGURES

Other advantages and embodiments of the invention will become apparent with the detailed description of figures which is given in a non-limiting manner and shows two examples of implementation of a system according to the invention.

DETAILED DESCRIPTION OF THE INVENTION

Figure 1:
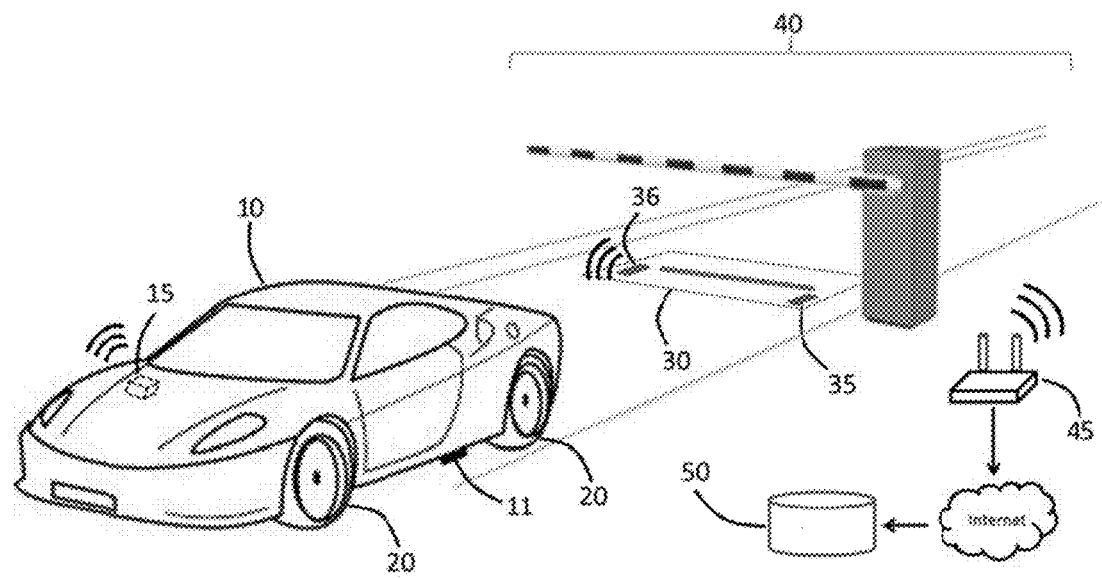
FIG. 1 schematically describes a system according to the invention.

In this example, a toll barrier 40 is provided with:
- a device 30 for measuring tyre wear
- an RFID reader 35
- a device 36 for transmitting information.

The measuring device 30 is in the form of a casing placed on the ground, over which a vehicle is intended to travel. This casing also comprises the RFID reader 35.

In an illustrative embodiment not shown in the figure, the casings containing the various subsystems are circular, and buried in the ground, such that their upper surface is planar and located parallel with and slightly below the level of the roadway or level with the roadway.

The measurement subsystem comprises a sensor unit, or one or more lines of sensors, for example of eddy current type, or variable reluctance sensors, with a view to measuring wear at a plurality of points of the tyre or measuring tyre pressure.

The sensors and the management electronics of the device 30 are powered by mains electricity originating from the toll barrier 40.

The RFID reader 35 is provided with one or more linear or circular polarization RFID reading antennae. These antennae are arranged at a plurality of positions in the road in the direction of the traffic such as to be able to sense the RFIDs mounted on the tyres more easily.

Advantageously, said antennae may be distributed over a running zone of up to 5 metres in length, but preferably 3 metres or less in length.

When a vehicle 10 runs over the device 30 for measuring wear, when passing through the toll barrier 40, the wear of the four tyres 20 is measured automatically by the measuring device 30.

Furthermore, when said vehicle 10 passes through the toll barrier 40, the RFID chips adhesively bonded to or integrated into the tyres 20 and the RFID chip 11 adhesively bonded to the vehicle 10 are read by the RFID reader 35 associated with the system 30 for measuring wear.

Once this identification and wear-level information has been captured, the data are transmitted to the vehicle 10 by means of the device 36 for transmitting data.

To this end, there are two possibilities:
- Either the data are transmitted directly from the device 36 to the device 15 for transmitting and receiving data that is present on the vehicle 10.

Or the data are transmitted from the device 36 to a remote database 50 by means of a device 45 for transmitting data that is associated with the toll barrier 40.

It is pointed out, here, that the transmitting means 36 and 45 may be embodied in one single device.

Once in the database 50, the data may then be retransmitted to the vehicle 10 using the data transmitting systems 45 and 15. In the example of FIG. 1, the vehicle 10 is equipped with means of communication with the driver of said vehicle, for communicating any type of information such as described previously in the present application.

Figure 2:
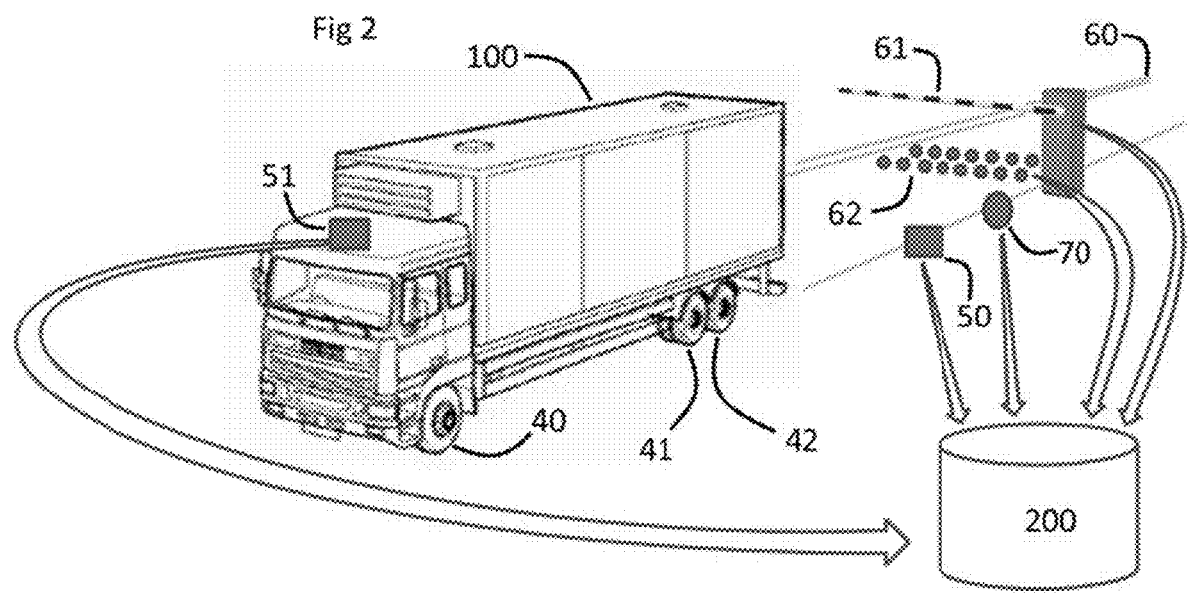
FIG. 2 schematically describes a system that includes a plurality of elements that make it possible to deliver new services or new functionalities.

FIG. 2 schematically describes a system that includes a plurality of elements that make it possible to deliver new services or new functionalities, for example for the benefit of road hauliers, drivers or infrastructure management companies. In the example of FIG. 2, there is no need systematically to bring together all the building blocks present in the diagram in order to deliver a new service.

In this example, a heavy goods vehicle 100 is equipped, on each side, with tyres 40, 41 and 42, each comprising a pressure and/or temperature sensor and an RFID chip. The sensor is, for example, adhesively bonded to the middle of the face opposite the tyre tread, but it could be installed in any other position on the interior rubber of the tyre or on the wheel rim.

Such a sensor makes it possible to measure numerous parameters of the tyres, such as, for example:

inflation pressure the temperature of the air inside the tyre the number of revolutions completed by said tyre when running the length of the area of contact of said tyre when the sensor is adhesively bonded to the interior rubber of the tyre, preferably on the side opposite the tread.

The RFID chip, meanwhile, may be embedded in the rubber of the tyre or affixed in the form of a tag or, alternatively, be installed in a rubber envelope affixed to the tyre, commonly called a "patch".

This chip makes it possible to store an identifier that allows the tyre to be distinguished from any other identical tyre and also to ascertain the size, range and make of the tyre via a database.

In this example, the vehicle 100 is moving over a road 60, for example a road equipped with a toll barrier 61, systems 50 for communication between the road 60 and the vehicle 100, and readers 70 positioned along said road 60.

The readers 70 make it possible to read the RFID identifiers of the tyres as they pass and, advantageously, they also make it possible to read the data recorded in the pressure/temperature sensor. It also allows reading of an RFID identifier of the vehicle, if there is one.

With a view to enabling the vehicle 100 to communicate with the communication system 50, said vehicle 100 is provided with a communication casing 51 compatible with the casing 50. Alternatively, the casing 51 may likewise be provided with a satellite positioning functionality. Alternatively, this satellite positioning functionality is embedded in a casing distinct from the casing 51.

Furthermore, the communication systems 50 and 51 may exchange information with one or more remote databases 200. The same applies to any satellite positioning casing separate from the casing 51.

Lastly, the roadway of the road 60 is provided with a system 62 that allows the wear of tyres mounted on the vehicles travelling over said road 60 to be assessed, such a system already having been described above.

The system 62 for measuring wear, the toll barrier 61 and also the RFID readers 70 likewise comprise means for communicating the data they acquire to remote databases 200. These communication means make it possible to establish direct communication with the databases or indirect communication via the use of casings 50 arranged along the road.

In this example, the toll barrier is further equipped with means (not shown) for identifying clients who have vehicles that are using the road 60 and with means for timestamping when the vehicle passes by.

The system 62 for measuring wear makes it possible not only to measure tyre wear but also to detect the direction of travel of vehicles that are using the road 60, to measure the surface area of the area of contact of the tyres and to measure the speed at which said tyres pass by.

On the basis of these different elements, and by combining them together, it is possible to determine different relevant indicators for providers of services.

For example, detection of the direction of travel of vehicles may make it possible to determine an indicator of an incorrect direction of travel and thus to provide this indicator to law enforcement personnel who could then stop a vehicle erroneously travelling in the direction contrary to the normal direction of traffic of a road. In this case, the system 62 is preferably positioned at the entry to rest areas along roads and transmits the indicator of an incorrect direction of travel to the database 200.

In another example, the RFID reader 70 reads identifiers of tyres and vehicles and transmits this information to the database 200. By doing so, it becomes possible automatically to associate tyres with a vehicle. This automatic association functionality is a genuine advantage in terms of the tyre maintenance management systems used by road hauliers. Indeed, these systems currently require data to be input manually, which is costly in terms of time, in order to perform this association.

In a third example, the pressures, wear and identity of the tyres in the database 200 are determined and transmitted to the database 200. In this case, it becomes possible to operate a tyre maintenance service from said database 200.

In an example in which the relevant indicator is an indicator of incorrect inflation pressure, an alert could be sent to the driver who would then go to a maintenance centre qualified to repair the defective tyre and to set the pressure to the correct level.

In the case in which the indicator is an indicator of the evolution of wear, it may indicate a future need for regrooving, retreading, swapping or rotation on the rim. Thus, such an indicator could be used in order to programme the necessary work at a rest area equipped with a maintenance centre or to request the vehicle driver to alter his route in order to attend such a centre.

In a fourth example, use could be made of a measurement of the length of the area of contact or of the surface area of the area of contact in order to estimate the load carried by the tyres.

Indeed, the surface area of the area of contact of a tyre is dependent on its inflation pressure and the load it is transporting. In the case of heavy goods vehicles, the evolution of the surface area of the area of contact is ascertained essentially via the evolution of the length of said area of contact. Thus, information on the load carried by each tyre of a vehicle could be estimated on the basis of the length measured by the sensor equipping said tyres and by the pressure measured by the same sensor.

Alternatively, the surface area of the area of contact measured by the system 62 for measuring wear could be combined with the pressure measurement carried out by a sensor present inside tyres, be this adhesively bonded to said tyres or simply secured to the corresponding rim. In this case, it would be possible to estimate the load carried by tyres of cars or heavy goods vehicles.

In one illustrative embodiment, information on pressure and surface area or length of the area of contact are transmitted to the remote database 200 with a view to the load being estimated using a remote information system. It is then possible to determine a vehicle load indicator for providing one of the following services:

- Informing the authorities when a heavy goods vehicle laden over and above legal limits is travelling on the public highway. Law enforcement personnel could then stop the vehicle in question with a view to preventing premature degradation of the roadway.
- Proposing a pricing structure for travelling on a motorway dependent on the load level of vehicles. This would make it possible to set different motorway charges as a function of the impact of a vehicle on degradation of the roadway.
- Detecting potential excess loads on cars. In the case of the positioning of the measuring system 62 at a toll barrier, the identification of the vehicle by the toll barrier or by an RFID reader 70 would make it possible to cross-reference the two items of information and to prevent the entry onto the motorway of vehicles in which the load level does not make it possible to guarantee a sufficient safety level while travelling.

In another example, a method according to the invention seeks to improve the safety of travel by road or motorway, by determining an indicator concerning the road-holding of the vehicle relative to the ground it is travelling over. To this end, the information measured by the system 62 for measuring wear, and also the identifiers of the tyres and of the vehicle, and the vehicle geolocation data are transmitted to the remote database 200. Furthermore, in this same database, information concerning the weather on the road network are provided from an external data source.

On the basis of this information, and in the knowledge of the characteristics of the tyre, it is possible to determine a relevant indicator concerning the risks of a vehicle losing road-holding, and thus to provide the following services:

- Alerting and advising the driver when the tyre is approaching the legal wear limit if said vehicle is approaching a zone where there is bad weather incompatible with the level of wear of the tyres. For example, in the event of a violent storm on the road network.
- Alerting and advising the driver if the type or the level of wear of the tyres means that it is hazardous for the vehicle to travel in falling snow on the road network. Thus, it would be possible to avoid the roadside immobilization of the vehicle with summer tyres or tyres that are too worn. An alternative itinerary more adapted to the tyres could then automatically be proposed.
- Taking control of the vehicle via active safety systems with a view to limiting vehicle speed and preventing a loss of road-holding on account of aquaplaning
- For law enforcement personnel, using information on wear, tyre identification and vehicle identification mentioned in this patent with a view to detecting vehicles in which the type and the condition of the tyres is incompatible with meteorological conditions and forcing such vehicles to stop at rest areas.

In this example, alerts and advice are issued automatically from the information system hosting the database 200 and are transmitted to the vehicles via the communication casings 50 and 51. To that end, the information system hosting the database 200 would be equipped with a computation unit capable of calculating road-holding limits in accordance with diverse weather conditions, taking account of the tyre type.

Indeed, tyre tread patterns are cut in to a greater or lesser extent depending on the use for which the tyres are envisaged. Thus, for identical wear, they may have a greater or lesser capacity to evacuate rainwater. This leads to a greater or lesser likelihood of aquaplaning Similarly, the type of material of which the tread is composed may have an impact on road-holding in wet conditions and/or at low temperatures. All these elements could be taken into account in the computation unit mentioned previously with a view to delivering optimum services.

It is important to note that the same services may be provided to the driver if the tyres mounted on vehicles are logged directly by human action into the database 200 and not automatically detected by RFID readers 70.

The invention claimed is:

1. A method for providing a service linked to the condition and/or behavior of a vehicle and/or of a tire, the method comprising the following steps:
   - determining an identifier of the vehicle and/or of a tire of the vehicle, when the vehicle passes a road infrastructure equipped with a system for assessing the condition of the vehicle;
   - at the same time, determining at least one parameter representative of the condition of the vehicle and/or of the tire, wherein the at least one parameter representative of the condition of the vehicle and/or of the tire comprises a level of wear of the tire;
   - geolocalizing the vehicle as it passes over the road infrastructure;
   - transmitting the determined data and geolocation data to a remote data server;
   - from the identification data, retrieving external data from an external database concerning the vehicle and/or the tire and/or running conditions, wherein the external data comprises weather information based on the geolocation data;
   - combining the determined information with the external data such as to determine a relevant indicator concerning the condition and/or the behavior of the vehicle; and
   - transmitting the relevant indicator to a provider of a service linked to the condition and/or to the behavior of a vehicle and/or of the tire,
   - wherein the system for assessing the condition of the vehicle comprises a subsystem for measuring the condition of at least one tire of the vehicle, the subsystem comprising an eddy current wear sensor or a variable reluctance wear sensor configured to measure the level of wear of the tire.

2. The method according to claim 1, wherein the step of determining an identifier comprises a step of reading an RFID identifier installed on the vehicle and/or on the tire.

3. The method according to claim 1, wherein the at least one parameter representative of the condition of the vehicle and/or of the tire is further selected from the group consisting of the pressure of the tire, the temperature of air inside the tire, the length of the area of contact of the tire, the speed of the vehicle, the direction of travel of the vehicle, and the load carried by the vehicle and/or by each tire.

4. The method according to claim 1, wherein the external data are selected from the group consisting of dimensions and/or characteristics of the tire, characteristics of the vehicle, meteorological data, and data concerning the condition of a road.

5. The method according to claim 1, wherein the step of determining at least one parameter representative of the condition of the vehicle and/or of the tire comprises a step of reading data stored in a pressure and/or temperature sensor installed on or in the tire of the vehicle and/or on a wheel rim of the vehicle.

6. The method according to claim 1, wherein the step of determining at least one parameter comprises a step of measuring a depth of rubber remaining on the tire by means of magnetic sensors integrated into the system for assessing.

7. The method according to claim 1, wherein the relevant indicator is a vehicle overload indicator and the provider of a service is a motorway concession company and/or law enforcement personnel.

8. The method according to claim 1, wherein the relevant indicator is an indicator of an incorrect direction of travel and the provider of a service is a motorway concession company and/or law enforcement personnel.

9. The method according to claim 1, wherein the relevant indicator is an indicator of the evolution of the wear of a tire and the provider of a service is a vehicle fleet manager and/or a vehicle maintenance agent.

10. The method according to claim 1, wherein the relevant indicator is an indicator of the incorrect inflation pressure of a tire and the provider of a service is a vehicle fleet manager and/or a vehicle maintenance agent.

11. The method according to claim 1, wherein the system for assessing the condition of the vehicle further comprises the following elements:
   a subsystem for reading identification data of the at least one tire and/or of the vehicle; and
   a subsystem for transmitting measured data and identification data to a remote database,
   wherein the three subsystems are installed in one or more casings designed to be installed on or near a road infrastructure, at least one of the casings being designed to be installed in a mandatory travel zone of the road infrastructure.

\* \* \* \* \*